United States Patent
Bifulco

(10) Patent No.: US 7,331,849 B2
(45) Date of Patent: Feb. 19, 2008

(54) BELT AND ROLLER FLATTENING APPARATUS

(76) Inventor: Phil Bifulco, 5829 NW. 85th La., Parkland, FL (US) 33067

( * ) Notice: Subject to any disclaimer, the term of this patent is extended or adjusted under 35 U.S.C. 154(b) by 0 days.

(21) Appl. No.: 11/334,633

(22) Filed: Jan. 18, 2006

(65) Prior Publication Data

US 2006/0205335 A1    Sep. 14, 2006

Related U.S. Application Data

(60) Provisional application No. 60/644,841, filed on Jan. 18, 2005.

(51) Int. Cl.
*A22C 9/00* (2006.01)
(52) U.S. Cl. ..................... 452/142
(58) Field of Classification Search ............ 452/141, 452/142, 174; 100/73–75, 152, 155 R, 161, 100/162 R, 163 R, 168, 169, 171–173, 176, 100/210, 910; 99/349, 353
See application file for complete search history.

(56) References Cited

U.S. PATENT DOCUMENTS

| | | | |
|---|---|---|---|
| 2,135,960 A | 11/1938 | Campbell | |
| 2,243,492 A | 5/1941 | Wilson | |
| 2,718,028 A | 9/1955 | Read et al. | |
| 3,716,893 A | 2/1973 | Vogelsang | |
| 4,085,482 A | 4/1978 | Charron | |
| 5,850,786 A * | 12/1998 | Bifulco | 100/343 |
| 6,257,132 B1 * | 7/2001 | Bifulco | 100/161 |
| 6,601,499 B1 * | 8/2003 | Bifulco | 100/73 |

* cited by examiner

*Primary Examiner*—Thomas Price
(74) *Attorney, Agent, or Firm*—Oltman, Flynn & Kubler

(57) ABSTRACT

An apparatus for tenderizing, progressively flattening and smoothing food items includes a roller set of substantially parallel rollers arrayed laterally for contacting, mechanically advancing and tenderizing a first side of a food item; and a compressing conveyor belt opposing and spaced apart from the roller set for contacting and advancing a food item second side, the roller set and the compressing conveyor belt converging toward each other to define a gap between the roller set and the conveyor belt tapering from a wider gap end to a narrower gap end for progressively flattening food items fed into the wider gap end; the roller set and the conveyor belt defining a roller set and conveyor belt combination. A second version includes a series two or more opposing compressing conveyor belt pairs having decreasingly coarse outer surface textures.

19 Claims, 15 Drawing Sheets

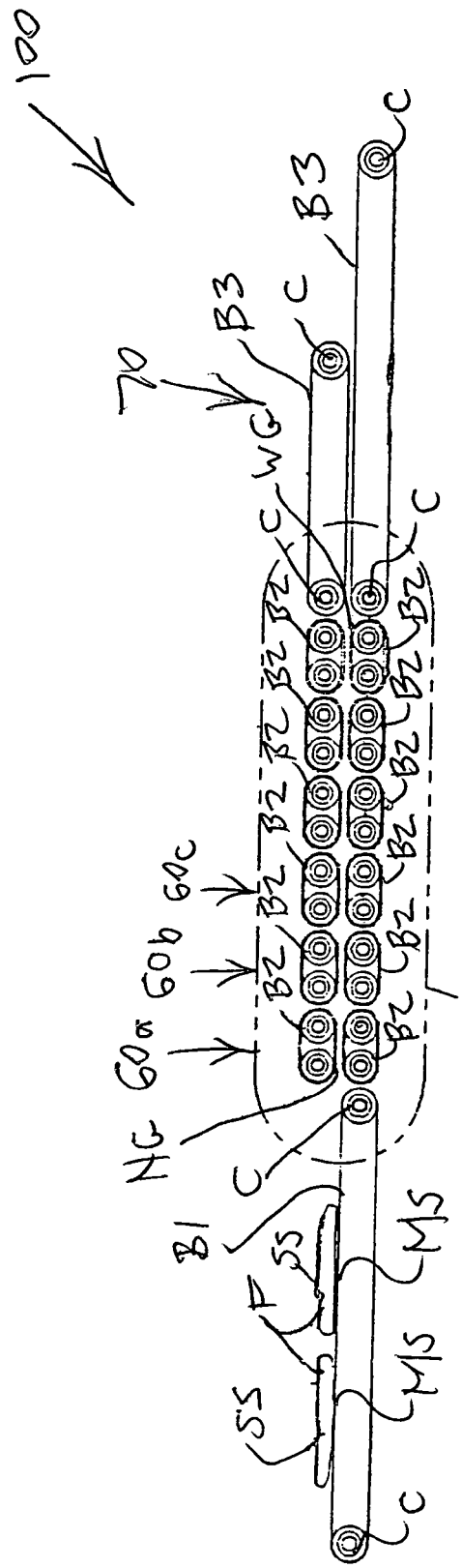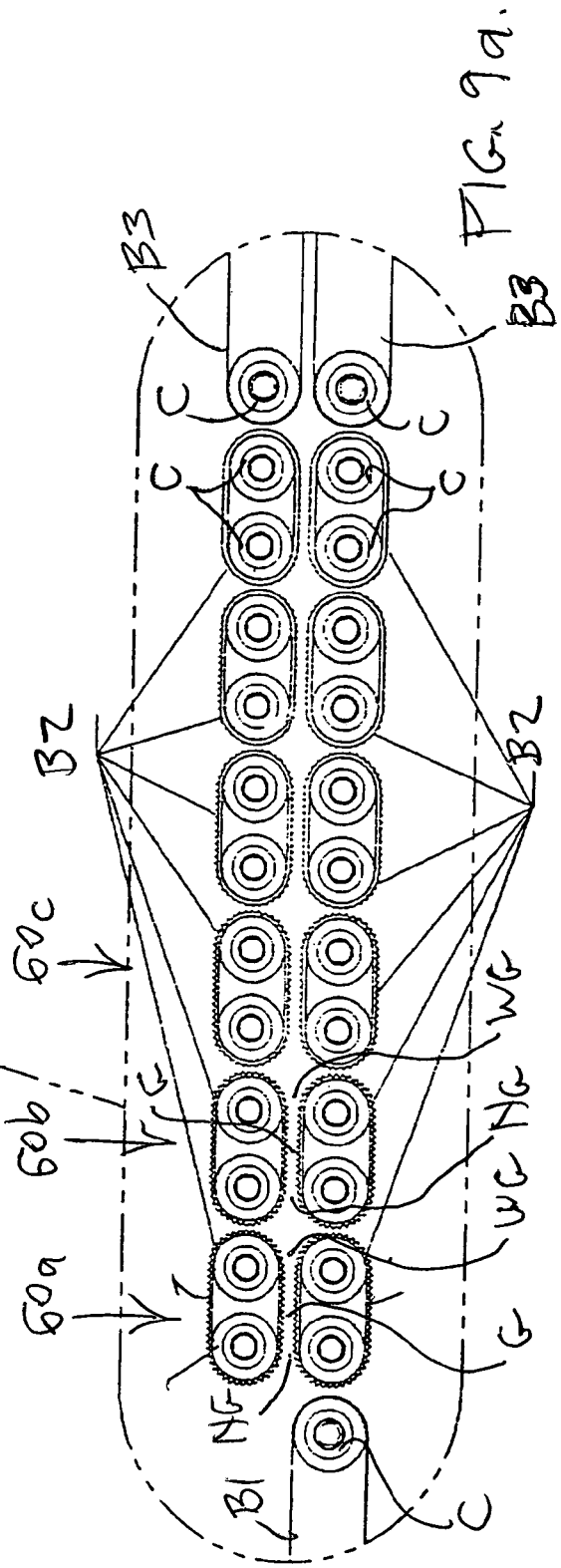
FIG. 9
FIG. 9a.

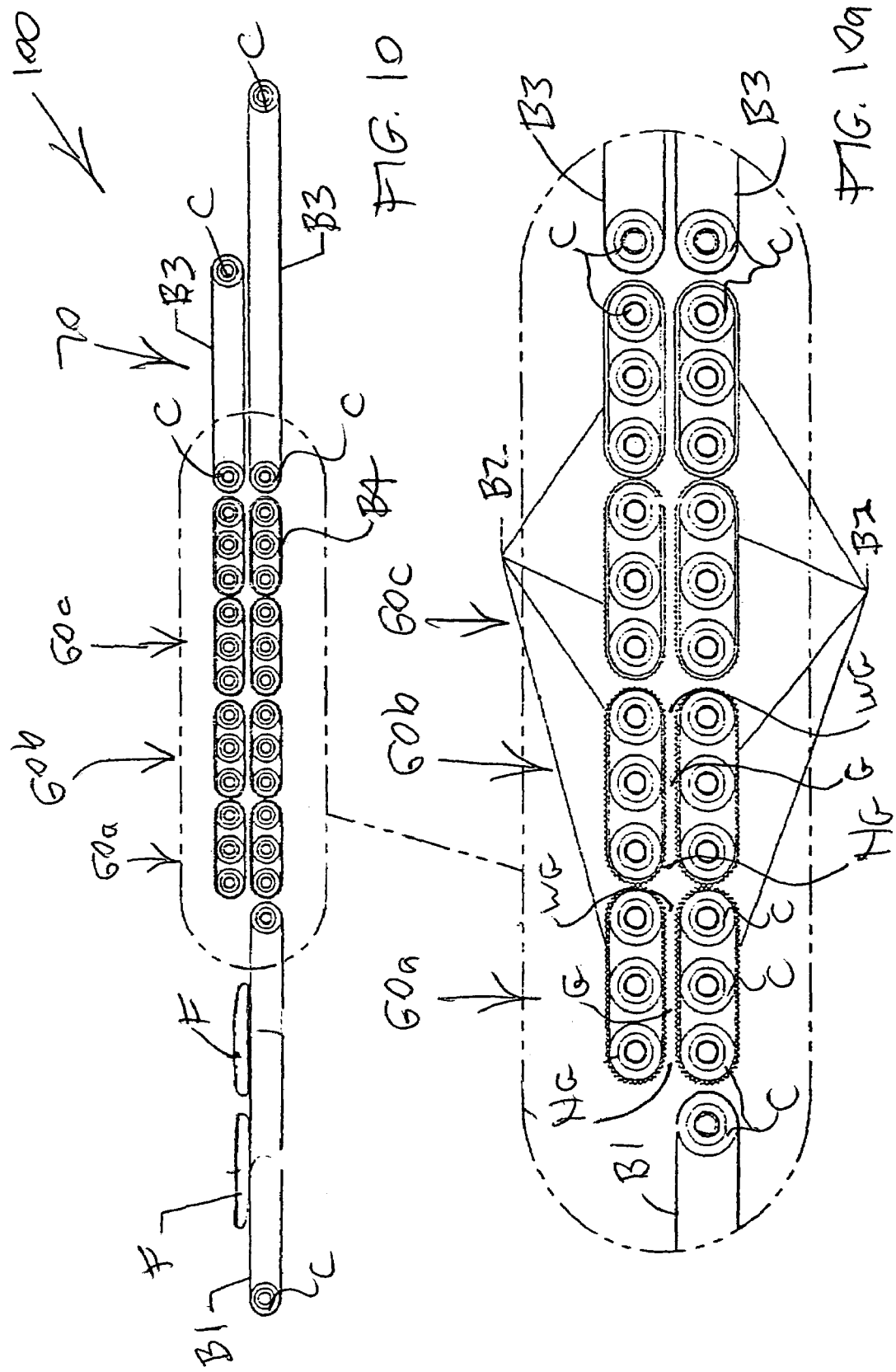

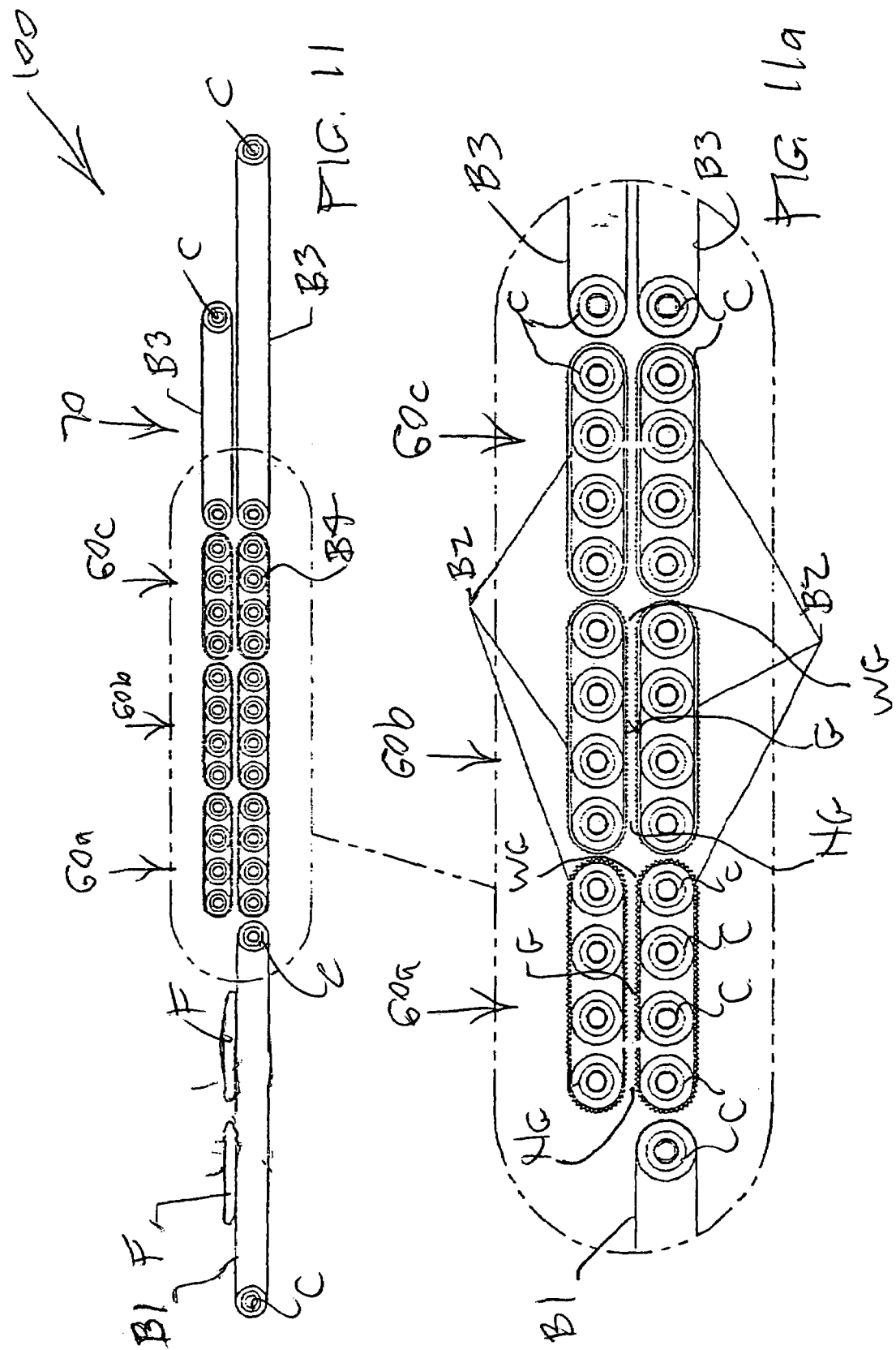

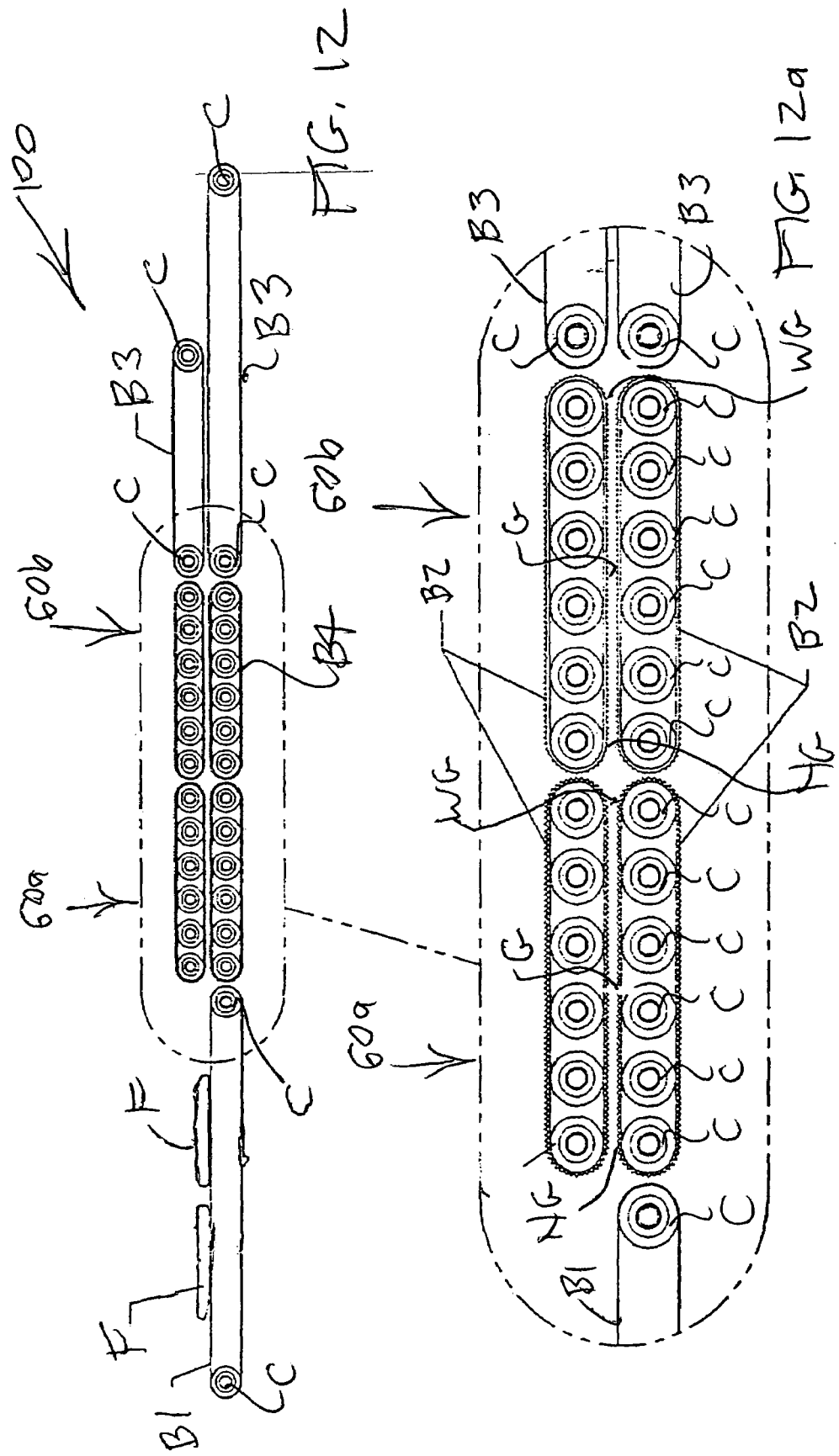

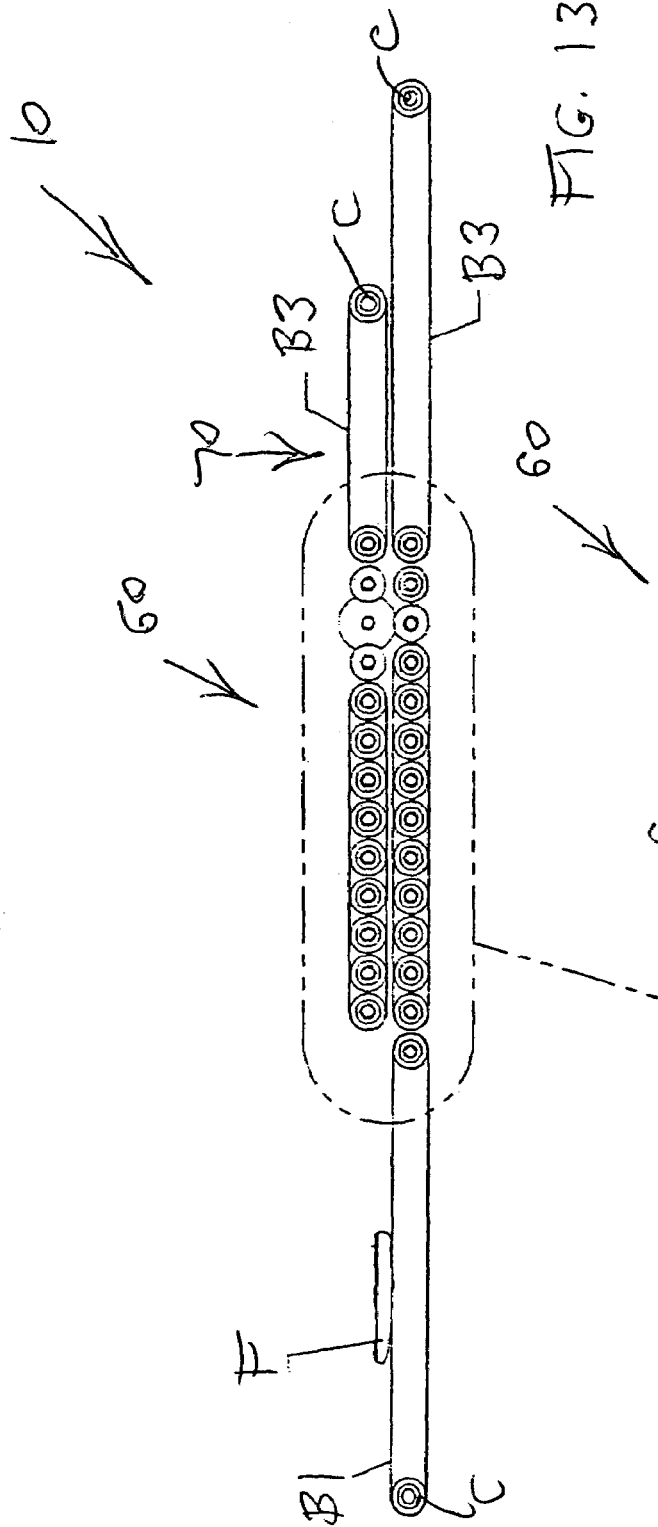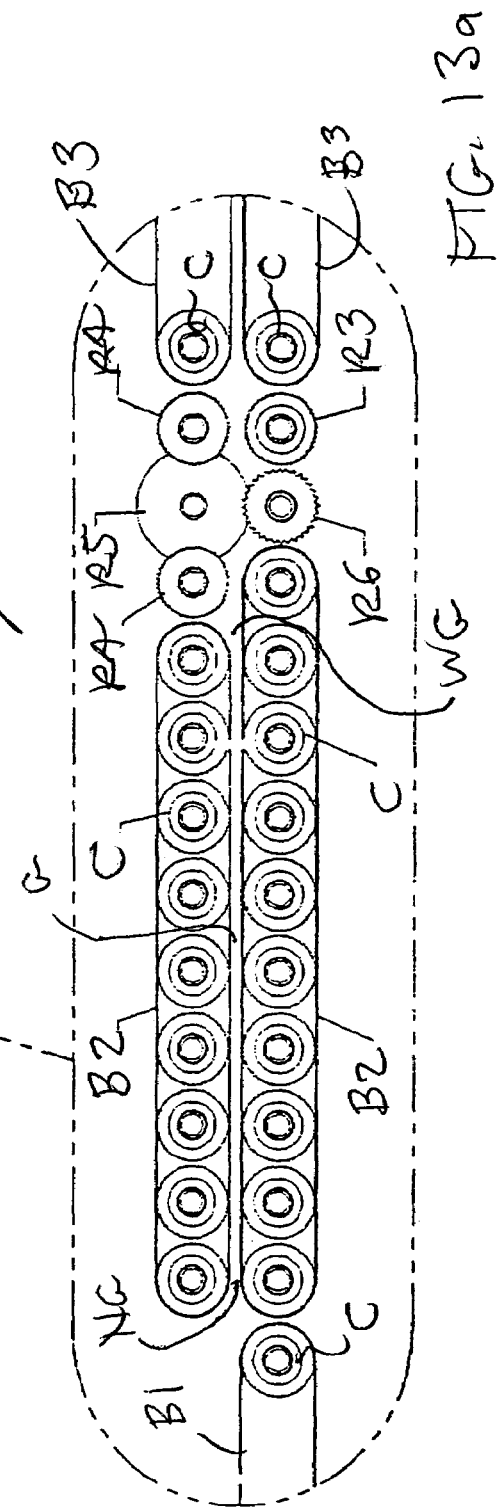
FIG. 13
FIG. 13a

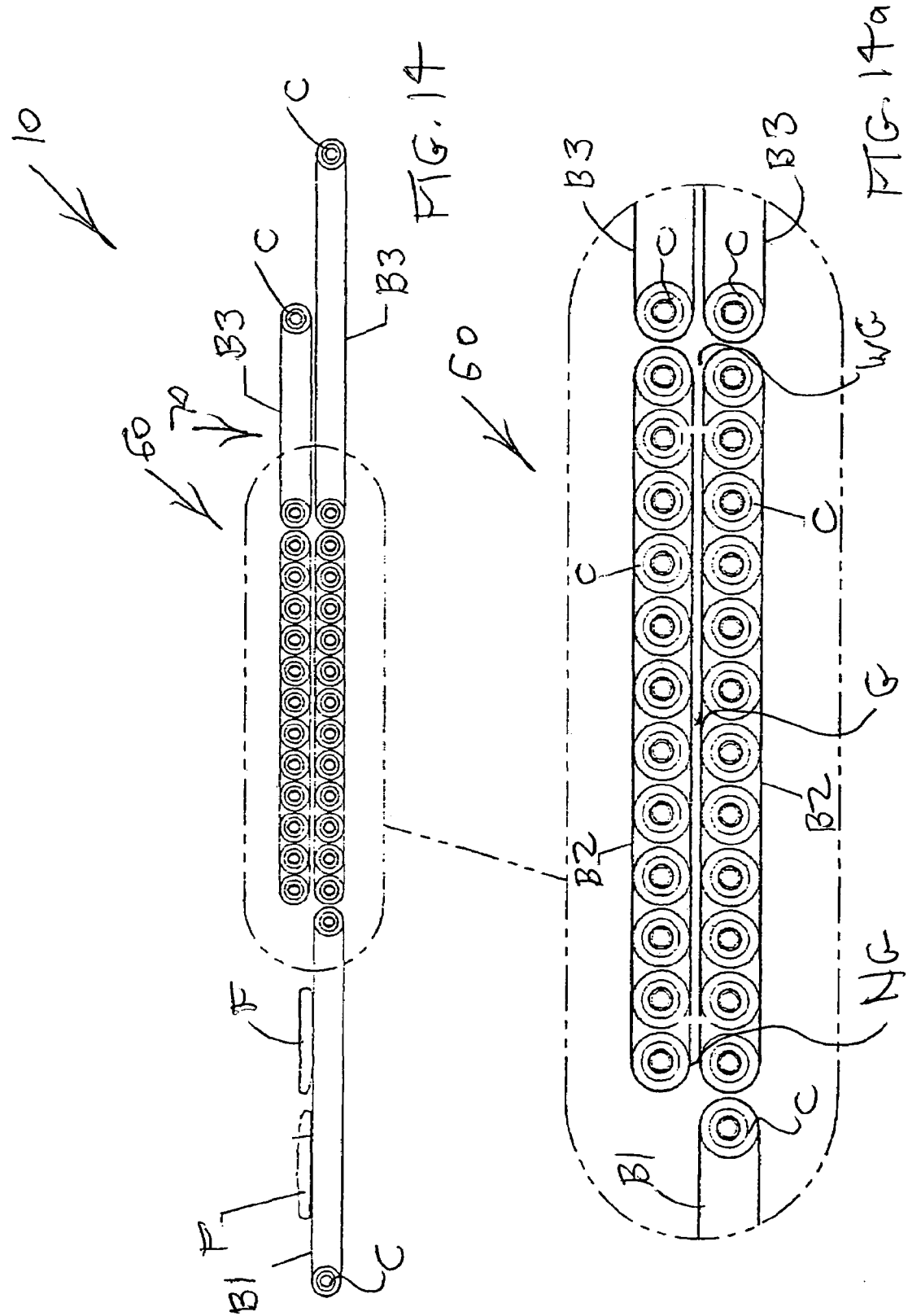

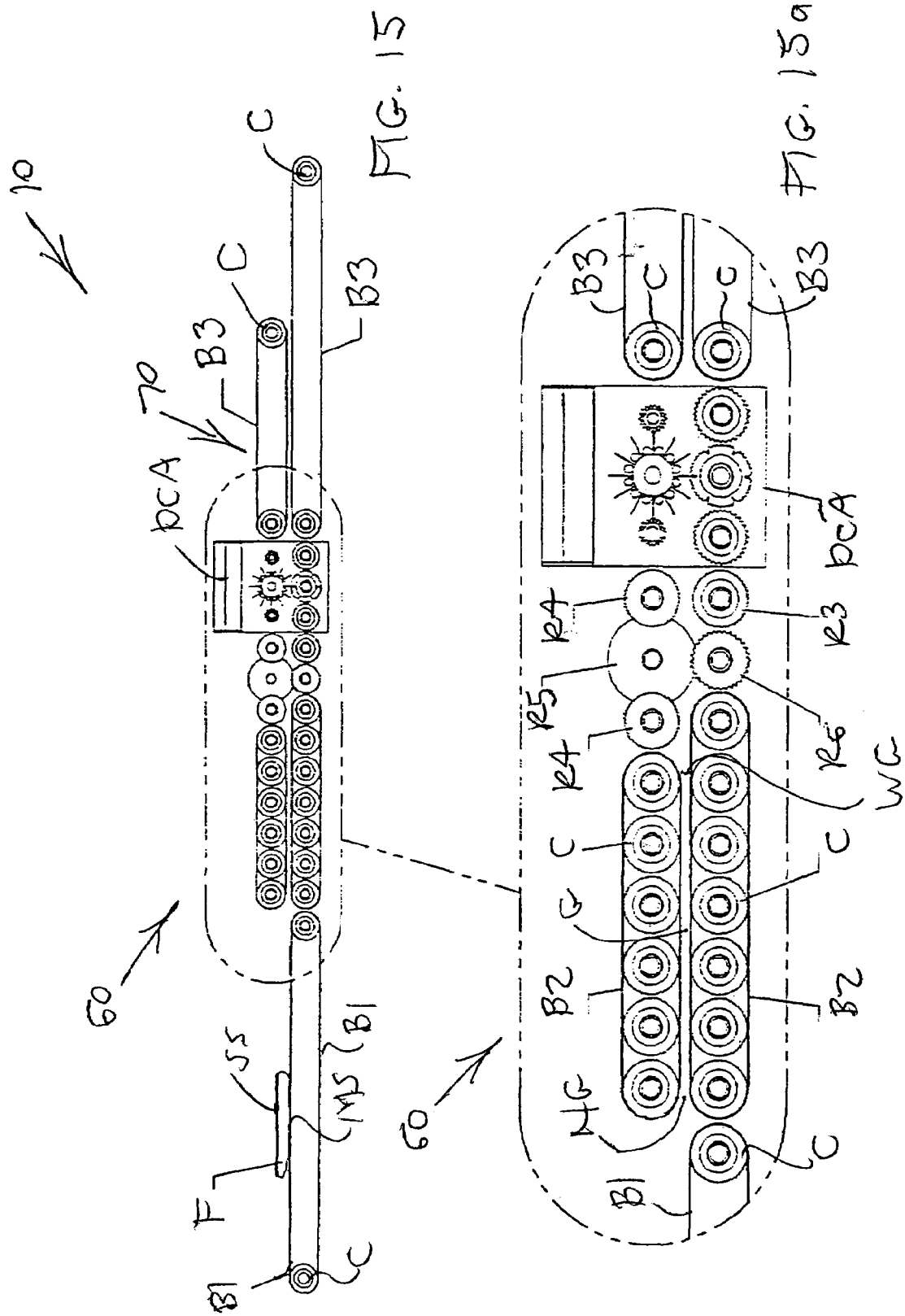

BELT AND ROLLER FLATTENING APPARATUS

FILING HISTORY

This application continues from provisional application Ser. No. 60/644,841 filed on Jan. 18, 2005.

BACKGROUND OF THE INVENTION

1. Field of the Invention

The present invention relates generally to the field of food shaping devices. More specifically the present invention relates to an apparatus for tenderizing, progressively flattening and smoothing food items in the form of poultry as well as various meats, including but not limited to beef, pork, veal, lamb, buffalo and venison to a uniform thickness while tenderizing the tougher membrane side of poultry and preserving the opposing softer and more volatile side of poultry.

One embodiment of the apparatus includes a set of substantially parallel rollers arrayed laterally for contacting, mechanically advancing and tenderizing by piercing and puncturing the membrane side of poultry and a compressing conveyor belt opposing and spaced from the series of rollers for contacting and advancing without damage the soft side of the poultry. The set of rollers and the conveyor belt converge toward each other to define a gap tapering from a wider gap end to a narrower gap end for progressively flattening food items fed into the wider gap end. On the other hand, some meats require the top belt or roller set to be parallel with the bottom belt or roller set for deeper roller penetration when meat initially enters the apparatus. Some meats require a narrower gap at the apparatus entry end and a wider gap at the apparatus exit end for still deeper penetration and a more textured product created from the coarser rollers at the apparatus entry end. The compressing conveyor belt rides on belt cylinders which are closely spaced to prevent the belt from deflecting as the food product is compressed by movement through the progressively narrowing gap. At least one belt cylinder and each roller are independently driven by a gear drive train drivably connected to an electric motor or other drive means. The conveyor belt outward surface is smooth or is textured as needed for the particular poultry or meat. The belt cylinders are preferably formed of stainless steel, aluminum or plastic and have knurled grooves for belt traction. The rollers also are formed of stainless steel and several roller configurations are provided as described in prior patents to applicant. In addition to rollers and belts, strip cutters and dice cutters may be included.

A second embodiment of the apparatus includes a series of compressing conveyor belt pairs. Once again, the pairs of opposing compressing conveyor belts converge toward each other to define a gap tapering from a wider gap end to a narrower gap end for progressively flattening food items fed into the wider gap end. To prevent the food item from slipping backwards during flattening, the outer surfaces of the compressing conveyor belt pair have coarse textures. It is preferred that a series two or more opposing compressing conveyor belt pairs having decreasingly coarse outer surface textures be provided which are aligned to pass food items from the first compressing conveyor belt pair into the second compressing conveyor belt pair and optionally into a third compressing conveyor belt pair.

2. Description of the Prior Art

There have long been techniques for flattening meat. These have generally required the labor of butchers and food preparers who have to grip the meat with their hands, leading to inherent sanitation problems. Furthermore, such manual techniques do not result in a uniform flatness which can be necessary for even cooking and consistent cooking time for all areas of the meat, and for a desired aesthetic appearance. Opposing and converging pairs of roller sets do not protect the soft side of poultry or meat from damage. Opposing and converging conveyor belt pairs do not break into the membrane side or muscle side of the poultry or meat food item, and if much pressure is applied to reduce the food item thickness there is not enough traction on the belts and the food item begins to slip backwards, damaging the food item and halting production. Furthermore, when puncturing and piercing the membrane side and muscle side of the food item, the food item does not rebound to its original thickness during cooking. Similar problems exist for flattening chicken, veal, pork, lamp, goat, buffalo and venison.

Attempts have been made to solve these problems, and these attempts have led to the development of the devices disclosed in U.S. Pat. No. 2,135,960, issued on Nov. 8, 1938 to Campell; U.S. Pat. No. 2,243,492, issued on May 27, 1941 to Wilson; U.S. Pat. No. 2,718,028, issued on Sep. 20, 1955 to Read, et al.; U.S. Pat. No. 3,716,893 issued on Feb. 20, 1973 to Vogelsang; and U.S. Pat. No. 4,085,482 issued on Apr. 25, 1978 to Charron, none of which actually overcame these problems. The tenderizer type machines pierce and penetrate meat and further cause the meat to be chopped into separate pieces.

The apparatus generally disclosed in U.S. Pat. No. 5,850,786, issued on Dec. 22, 1998, in U.S. Pat. No. 6,257,132, issued on Jul. 10, 2001, and in U.S. Pat. No. 6,601,499, issued on Aug. 5, 2003, all to the present applicant, does in fact overcome these problems in that the device flattens uniformly and tenderizes pieces of meat mostly without need of handling by a person. Yet it would be further desirable to provide an apparatus which tenderizes the tougher membrane side of poultry while preserving the opposing softer and more volatile side.

It is thus an object of the present invention to provide an apparatus for flattening meat which combines a roller set with a compressing conveyor belt opposing and spaced from the roller set so that the roller set tenderizes and flattens without piercing and puncturing the membrane side of poultry and the conveyor belt contacts and advances the poultry or other food item without breaking into or otherwise damaging the softer side of the poultry. Using this roller configuration prevents the food item such as meat from slipping backwards when extreme pressure is applied.

It is another object of the present invention to provide such an apparatus which prevents meat from wrinkling as a result of wave motion caused by meat passing from one flattening roller to the next, by providing a series two or more opposing compressing conveyor belt pairs having decreasingly coarse outer textures which are aligned to pass food items from the first compressing conveyor belt pair into the second compressing conveyor belt pair and optionally into a third compressing conveyor belt pair.

It is finally an object of the present invention to provide such an apparatus which processes pieces of poultry and meat at high volume and rapidly, with minimal cost and maximum reliably.

SUMMARY OF THE INVENTION

The present invention accomplishes the above-stated objectives, as well as others, as may be determined by a fair reading and interpretation of the entire specification.

An apparatus is provided for tenderizing, progressively flattening and smoothing food items, the apparatus including a roller set of substantially parallel rollers arrayed laterally for contacting, mechanically advancing and tenderizing a first side of a food item; and a compressing conveyor belt opposing and spaced apart from the roller set for contacting and advancing a food item second side, the roller set and the compressing conveyor belt converging toward each other to define a gap between the roller set and the conveyor belt tapering from a wider gap end to a narrower gap end for progressively flattening food items fed into the wider gap end; the roller set and the conveyor belt defining a roller set and conveyor belt combination.

The compressing conveyor belt preferably rides on several closely spaced belt cylinders passing through the conveyor belt, and at least one of the belt cylinders and at least one of the rollers being independently driven by a gear drive train drivably connected to a drive mechanism. The conveyor belt has a conveyor belt outward surface which is one of smooth and textured. The belt cylinders and the rollers preferably are formed of one of: stainless steel, aluminum and plastic. The belt cylinders preferably have knurled grooves for enhanced conveyor belt traction. The rollers preferably are configured to define at least one of a scraper roller and a tenderizing roller. The apparatus preferably additionally includes at least one strip cutter and at least one dice cutter.

The apparatus optionally includes several of the conveyor belts including an infeed conveyor belt for drawing food items into the wider gap end, an outfeed conveyor belt for delivering food items out of the narrower gap end, and a finisher conveyor belt for pressing the final texture onto a food item surface. The apparatus optionally includes a series of at least first, second and third conveyor belts in which the first conveyor belt has outer surface grooves which are more coarse those of the second conveyor belt, which in turn are more coarse than those of the third conveyor belt. The apparatus optionally includes a series of opposing conveyor belt sets adjacent one of the wider gap end and the narrower gap end of the roller set and conveyor belt combination.

The roller set and conveyor belt combination optionally is vertically oriented such that the wider gap end is at the combination upper end and the narrower gap end is at the combination lower end, and additionally includes a substantially horizontally oriented infeed conveyor belt positioned to drop food items into the wider gap end; and a substantially horizontal outfeed conveyor belt positioned below the narrow gap end to receive and carry away food items dropped from the roller set and conveyor belt combination.

An apparatus is further provided for tenderizing, progressively flattening and smoothing food items, the apparatus including a series of first and second compressing conveyor belt pairs, each conveyor belt pair including two opposing compressing conveyor belts with belt outer surfaces converging toward each other to define a gap tapering from a wider gap end to a narrower gap end for progressively flattening food items fed into the wider gap end, the second compressing conveyor belt pair having a narrower gap than that of the first compressing conveyor belt pair, the compressing conveyor belt pairs being aligned to pass food items from the first compressing conveyor belt pair into the second compressing conveyor belt pair, where the coarseness of the belt outer surfaces of the second compressing conveyor belt pair is less than that of the first compressing conveyor belt pair.

Each compressing conveyor belt preferably rides on several closely spaced belt cylinders passing through the conveyor belt, and at least one of the belt cylinders being independently driven by a gear drive train drivably connected to drive mechanism.

BRIEF DESCRIPTION OF THE DRAWINGS

Various other objects, advantages, and features of the invention will become apparent to those skilled in the art from the following discussion taken in conjunction with the following drawings, in which:

FIG. 1a is a closeup of the roller set and compressing belt combination of FIG. 1.

FIG. 2a is a closeup of the roller set and compressing belt combination of FIG. 2.

FIG. 3a is a closeup of the roller set and compressing belt combination of FIG. 3.

FIG. 4a is a closeup of the roller set and compressing belt combination of FIG. 4.

FIG. 5a is a closeup of the roller set and compressing belt combination of FIG. 5.

FIG. 9 is a side schematic view of one version of the second embodiment including a single infeed conveyor belt, six opposing two cylinder compressing conveyor belt pairs followed by an outfeed conveyor belt pair.

FIG. 9a is a closeup of the compressing belt combinations of FIG. 9.

FIG. 10 is a view as in FIG. 9 except that four opposing three cylinder compressing conveyor belt pairs are provided.

FIG. 10a is a closeup of the compressing belt combinations of FIG. 10.

FIG. 11 is a view as in FIG. 10 except that three opposing four cylinder compressing conveyor belt pairs are provided.

FIG. 11a is a closeup of the compressing belt combinations of FIG. 11.

FIG. 12 is a view as in FIG. 11 except that two opposing six cylinder compressing conveyor belt pairs are provided.

FIG. 12a is a closeup of the compressing belt combinations of FIG. 12.

FIG. 13 is a view as in FIG. 14 except that the top compressing belt contains nine cylinders and combined with a first existing strip cutter clearance roller and one existing strip cutter blade roller followed by a second existing strip cutter clearance rollers. The bottom compressing belt contains ten cylinders, one existing cutter blade mate roller and one existing flattening roller.

FIG. 13a is a closeup of the compressing belt combinations and rollers of FIG. 13.

FIG. 14 is a view as in FIG. 11 except that one compressing belt pair, with each compressing belt containing twelve cylinders.

FIG. 14a is a closeup of the compressing belt combinations of FIG. 13.

FIG. 15 is a view as in FIG. 13, except that a flattening roller and a strip cutter mate roller and a dice cutter assembly are added.

FIG. 15a is a closeup of the compressing belt combinations and rollers of FIG. 15.

DETAILED DESCRIPTION OF THE PREFERRED EMBODIMENTS

Figure 1:
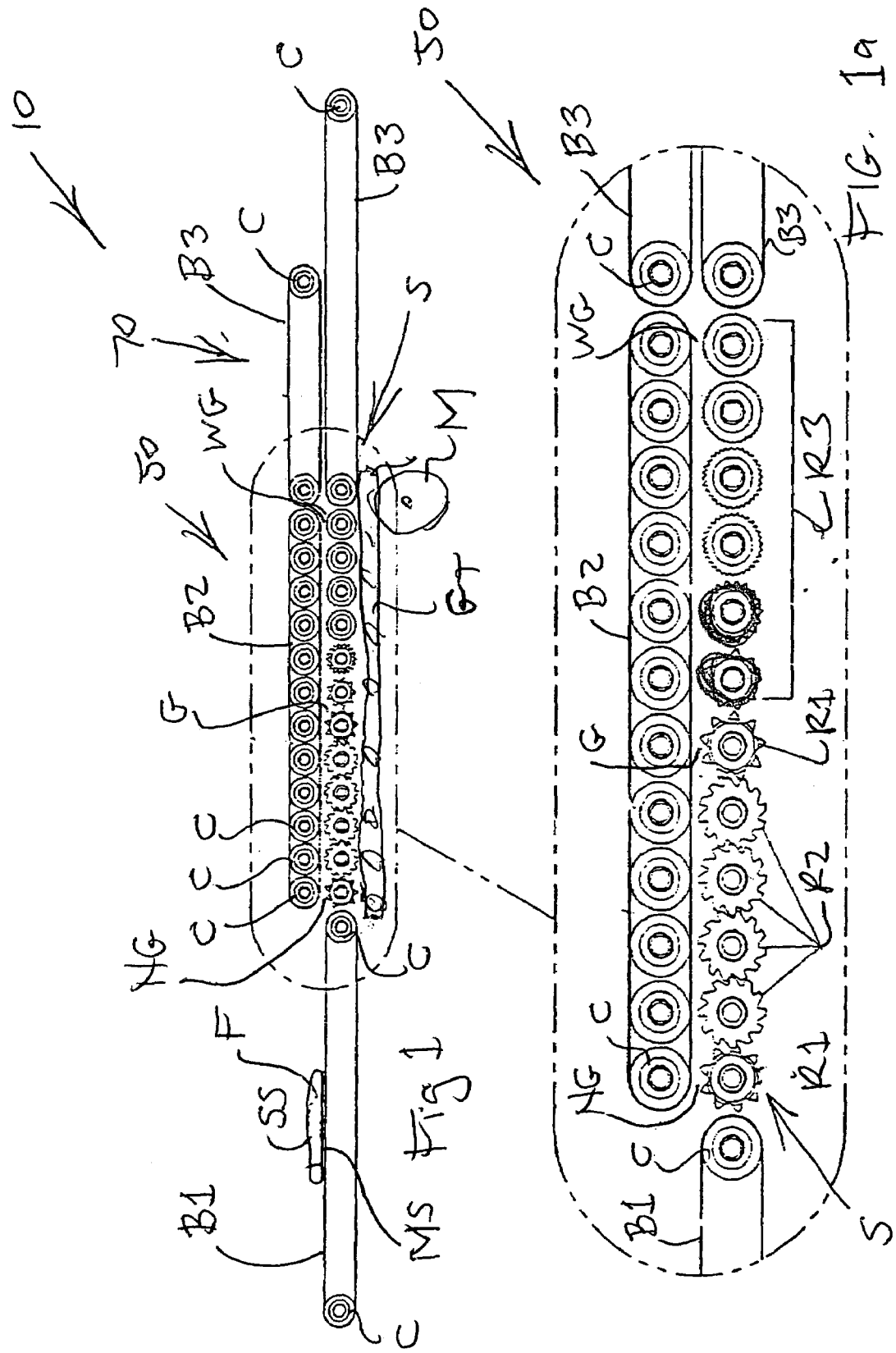
FIG. 1 is a schematic side view of one version of the first preferred embodiment, including an infeed conveyor belt, and the compressing conveyor belt and roller set pair combination with the belt on top and in which the roller set includes a first scraper roller, four tenderizing rollers, a second tenderizing roller and six flattening rollers, and opposing and spaced apart outfeed conveyor belts. As disclosed in prior patents to applicant, the tenderizing rollers function to pierce into the membrane or heavy tissue side of a poultry or meat food item.
Figure 2:
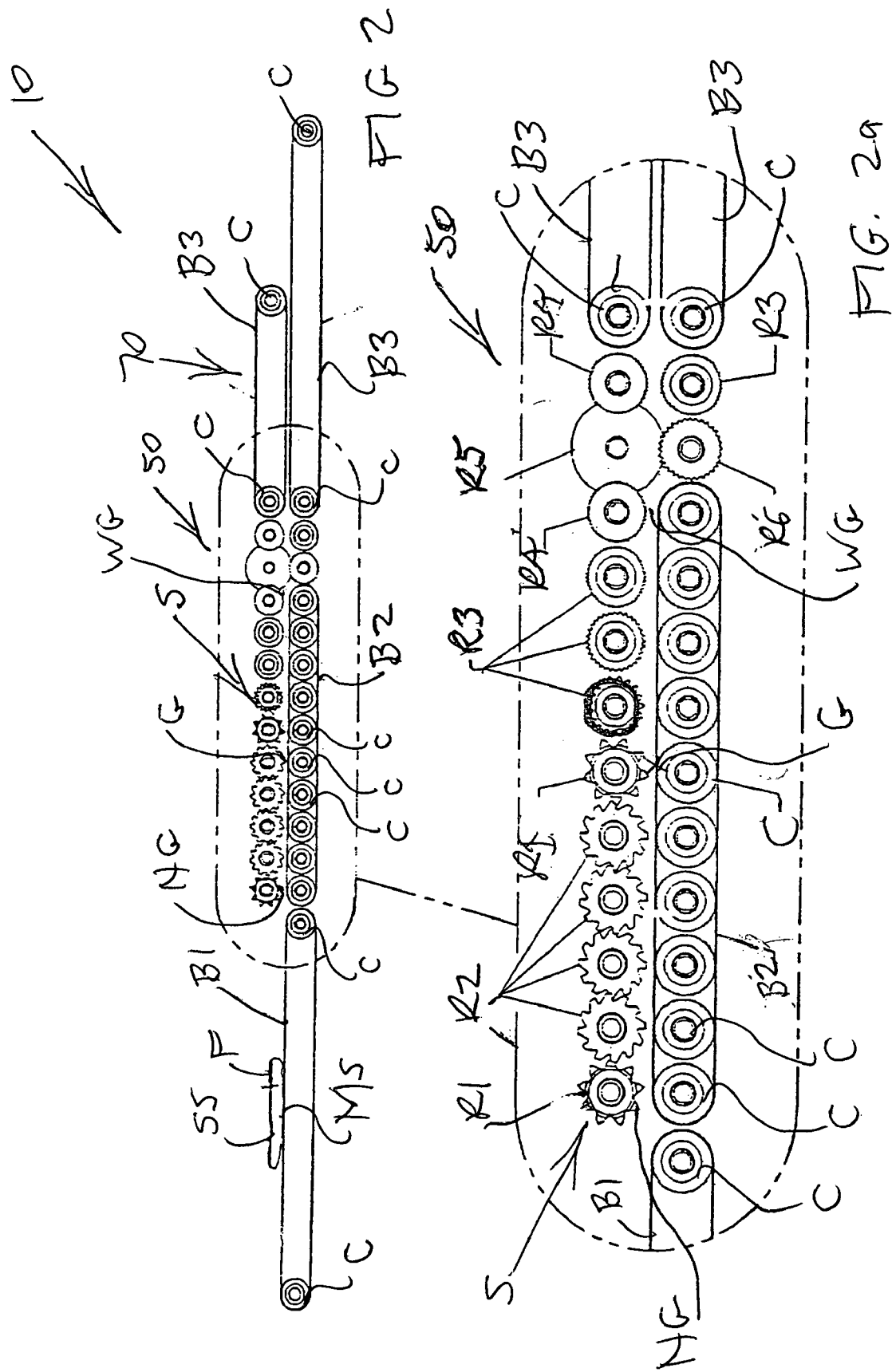
FIG. 2 is a view as in FIG. 1 except that the compressing conveyor belt is on the bottom paired with an existing strip cutter mate roller and the roller set on the top includes a first scraper roller, four tenderizing rollers, a second scraper roller, three flattening rollers, a first existing strip cutter clearance roller, an existing strip cutter blade roller, and a second existing strip cutter clearance roller.
Figure 3:
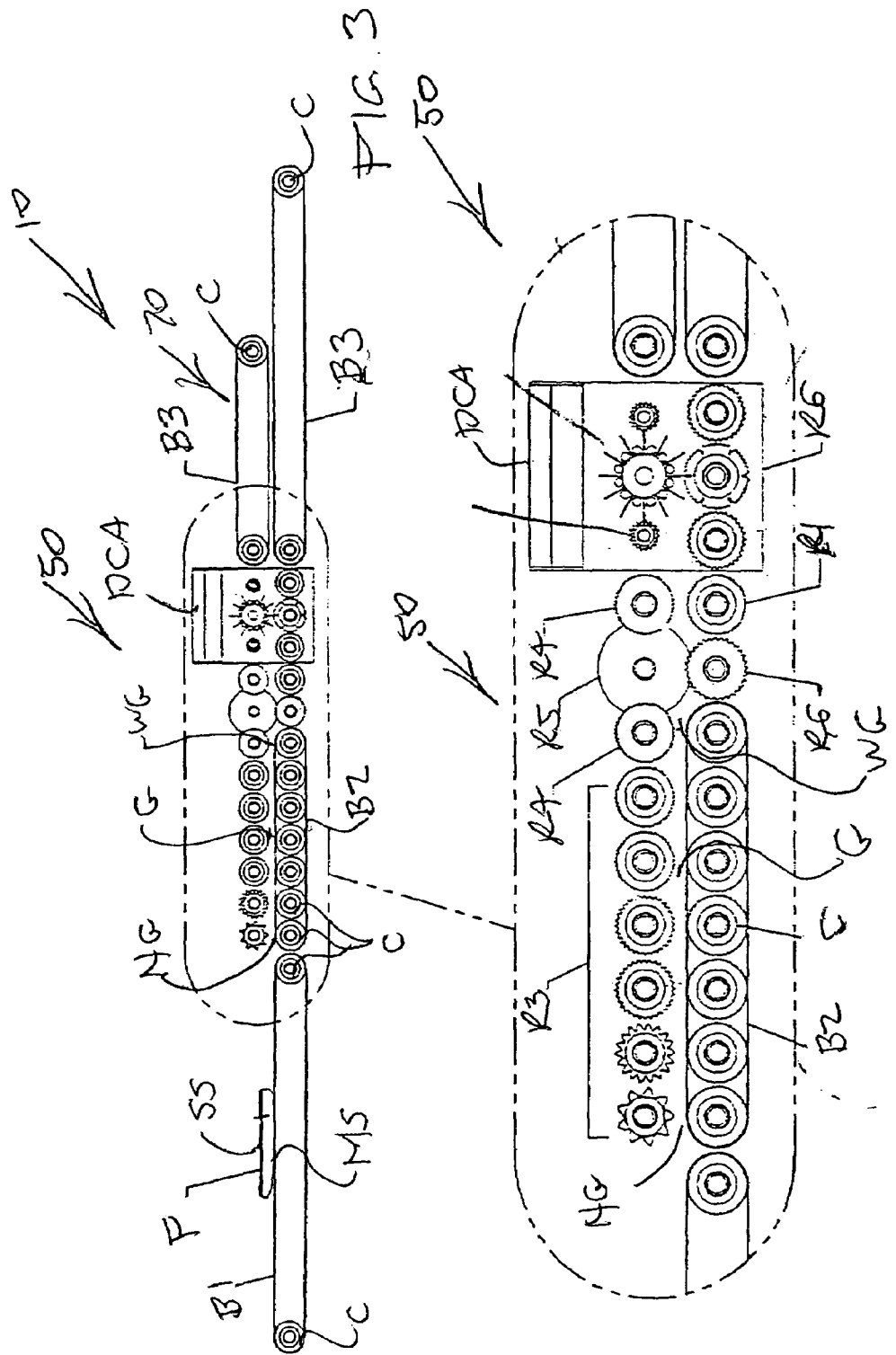
FIG. 3 is a view as in FIG. 2 except that the portion of the roller set opposing the compressing conveyor belt includes six existing flattening rollers, a first existing strip cutter clearance roller, an existing strip cutter blade roller, a second existing strip cutter clearance roller and an existing dice cutter assembly.
Figure 4:
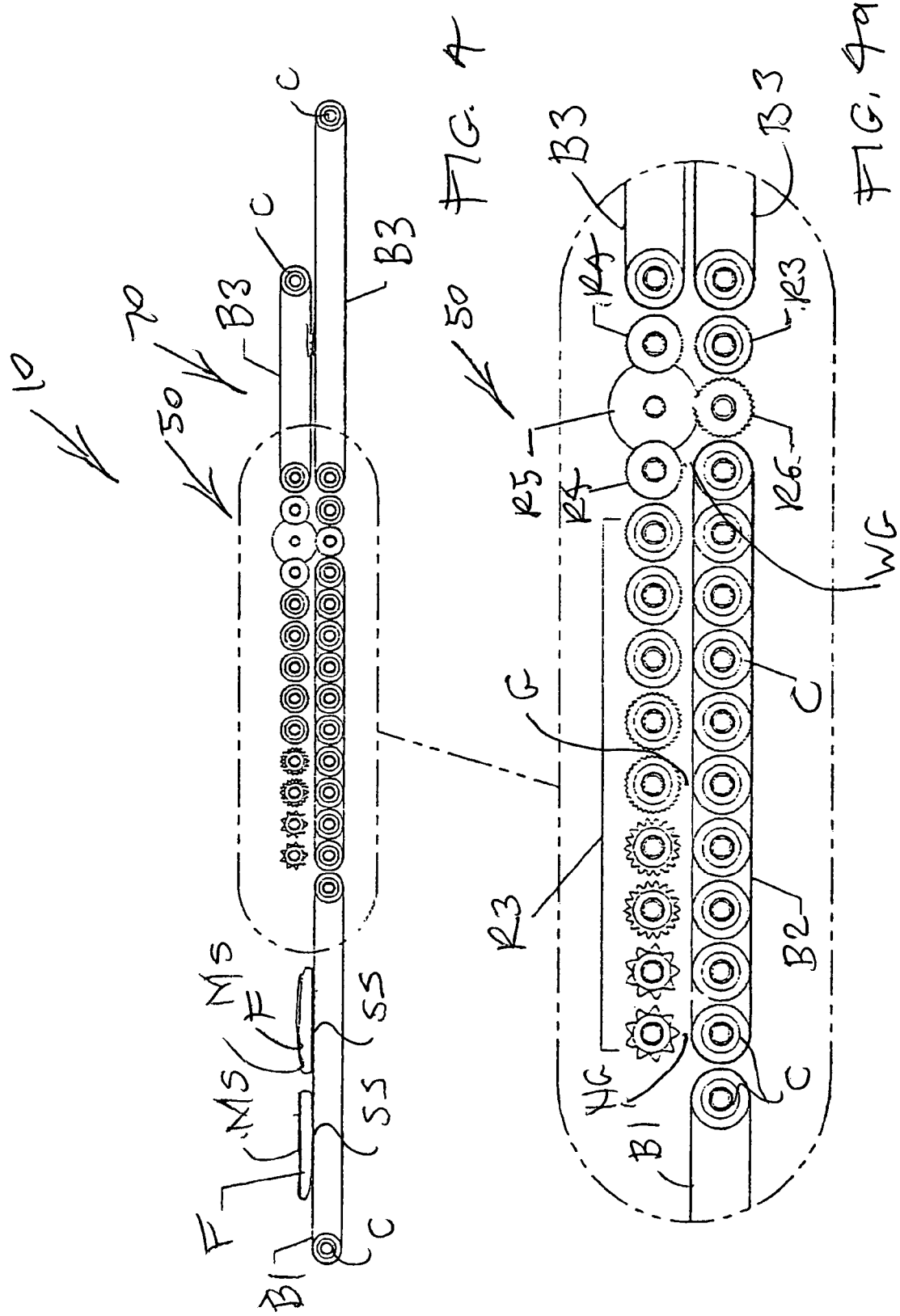
FIG. 4 is a view as in FIG. 2, in which the roller set includes existing flattening rollers, a first existing strip cutter clearance roller, one existing strip cutter blade roller, followed by a second existing strip cutter clearance roller, following the compressing conveyor belt an existing strip cutter mate roller and a flattening roller are provided.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1-8, an apparatus 10 is disclosed for tenderizing, progressively flattening and smoothing food items F in the form of poultry as well as various meats, including but not limited to beef to a uniform thickness while tenderizing the tougher membrane side MS of poultry and preserving the opposing softer side SS and thus more volatile side of the poultry. Apparatus 10 is an improved version of the meat flatting apparatus described in U.S. Pat. No. 5,850,786, issued on Dec. 22, 1998, in U.S. Pat. No. 6,257,132, issued on Jul. 10, 2001, and in U.S. Pat. No. 6,601,499, issued on Aug. 5, 2003, all to the present applicant, the contents of both of which are incorporated by reference.

Apparatus 10 includes a row or set S of substantially parallel rollers R arrayed laterally for contacting, mechanically advancing and tenderizing by piercing and puncturing membrane side MS of a poultry food item F, and a compressing conveyor belt B2 opposing and spaced from the roller set S for contacting and advancing without damage the soft side SS of the poultry food item F. The set of rollers, or roller set S, and compressing conveyor belt B2 converge toward each other to define a gap G between the set S and conveyor belt B tapering from a wider gap end WG to a narrower gap end NG for progressively flattening pieces of poultry or meat food items F fed into the wider gap end WG. The compressing conveyor belt B2 rides on belt cylinders C which are closely spaced to prevent the belt from deflecting as the food item F is compressed. At least one belt cylinder C as well as each roller R are independently driven by a gear train GT drivably connected to an electric motor M or other drive means.

The conveyor belt outward surface OS is smooth or is textured as needed for the particular poultry or meat food item F. The belt cylinders C preferably are formed of stainless steel, aluminum or plastic and preferably have knurled grooves (not shown) for belt B traction. The rollers R preferably are also formed of stainless steel, aluminum or plastic and have several roller R configurations as described in the above-referenced prior patents to applicant. These configurations include scraper rollers R1 and tenderizing rollers R2, as well as flattening rollers R3 which pierce into a poultry membrane side MS or heavy tissue side of the chicken breast or thick meat food item F while pushing the soft tissue side SS against the smoother compressing conveyor belt B2. There can be as many as twenty-two tenderizing rollers R2 and two scraper rollers R1, or as few as two tenderizing rollers R2 and two scraper rollers R1. In addition to rollers R1, R2, R3, strip cutter rollers R4, R5, R6 and dice cutter assembly DCA may be included.

Several exemplary embodiments of the belt and roller apparatus 10 are set forth below to show how this inventive combination can meet a variety of specific requirements. Conventional conveyor belts B can be added to the roller set and compressing conveyor belt combination 50, including an infeed conveyor belt B1 for drawing food items F into the wider gap end WG, and either one outfeed conveyor belt B3 or two opposing outfeed conveyor belts B3 for delivering food items F out of the narrower gap end NG and pressing the final texture onto the food F surface. See FIGS. 1-5.

Apparatus 10 may include an infeed conveyor belt B1, and a roller set and compressing conveyor belt pair combination 50 with the belt B2 on top and in which the roller set S includes an existing scraper roller R1, four existing tenderizing rollers R2 and six existing flattening rollers R3, and opposing and spaced apart outfeed conveyor belts B3 forming an outfeed conveyor belt pair 70, as illustrated in FIGS. 1 and 1a. As disclosed in prior patents to applicant, the tenderizing rollers R2 function to pierce into the membrane or heavy tissue side of a poultry or meat food item F.

Figure 5:
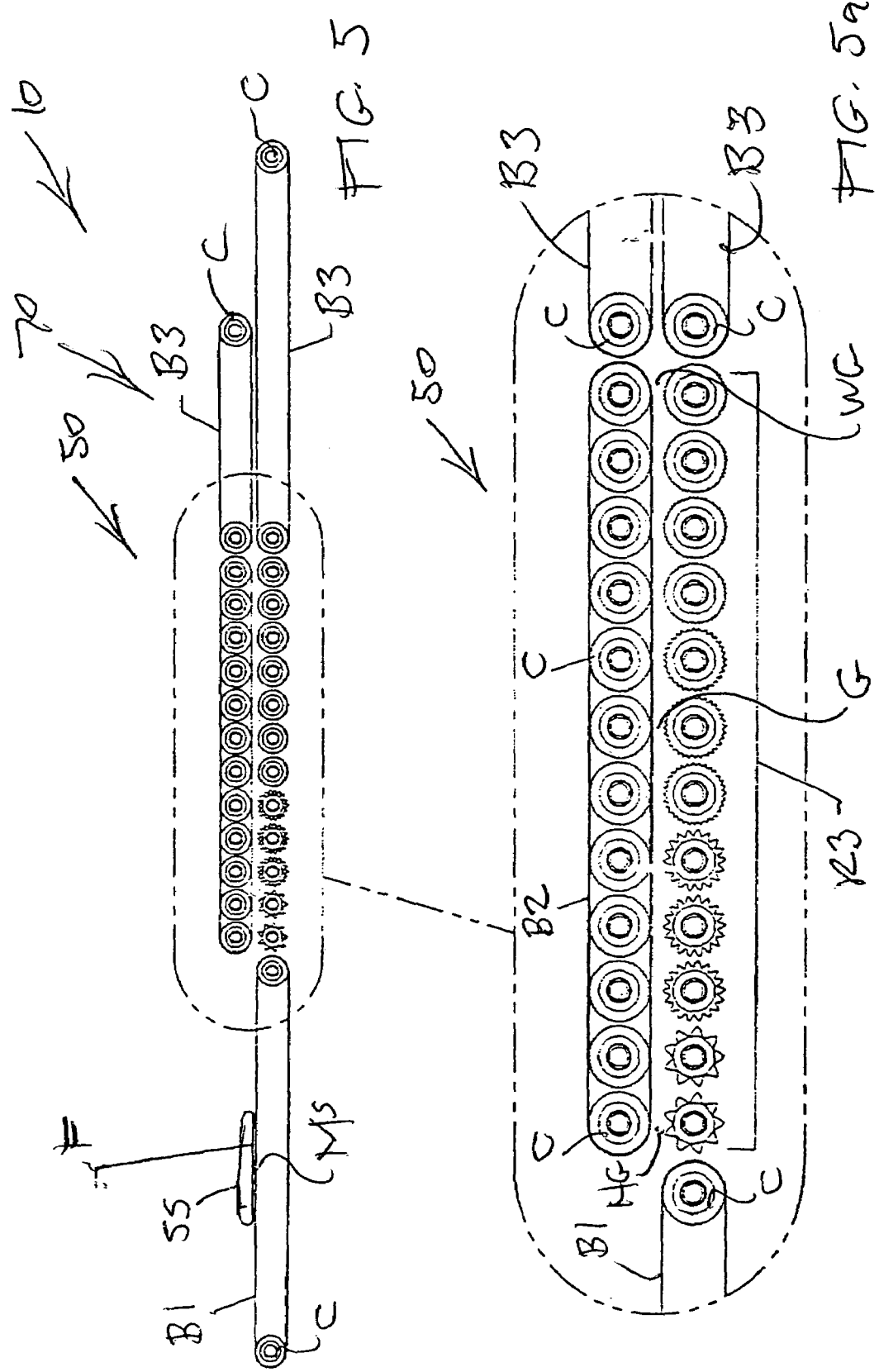
FIG. 5 is a view as in FIG. 1, in which the roller set includes twelve existing flattening rollers.
Figure 6:
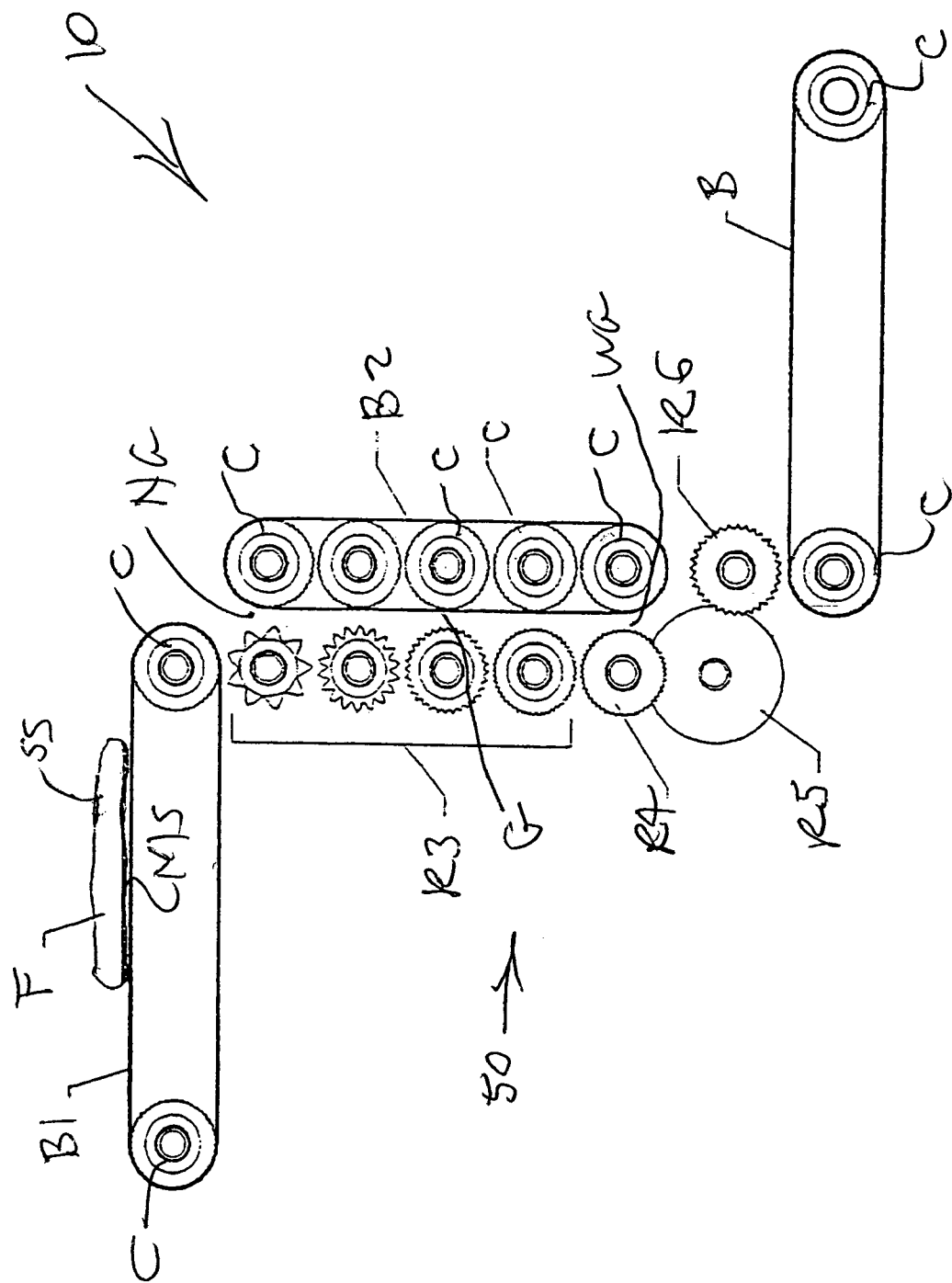
FIG. 6 is a variation of the embodiment of FIG. 1, in which the roller set and compressing conveyor belt pair is oriented vertically so that the food item feeds downwardly through it, and in which the roller set includes four flattening rollers, an existing strip cutter clearance roller and an existing strip cutter blade roller. Beneath the compressing conveyor belt is one existing strip cutter mate roller.
Figure 7:
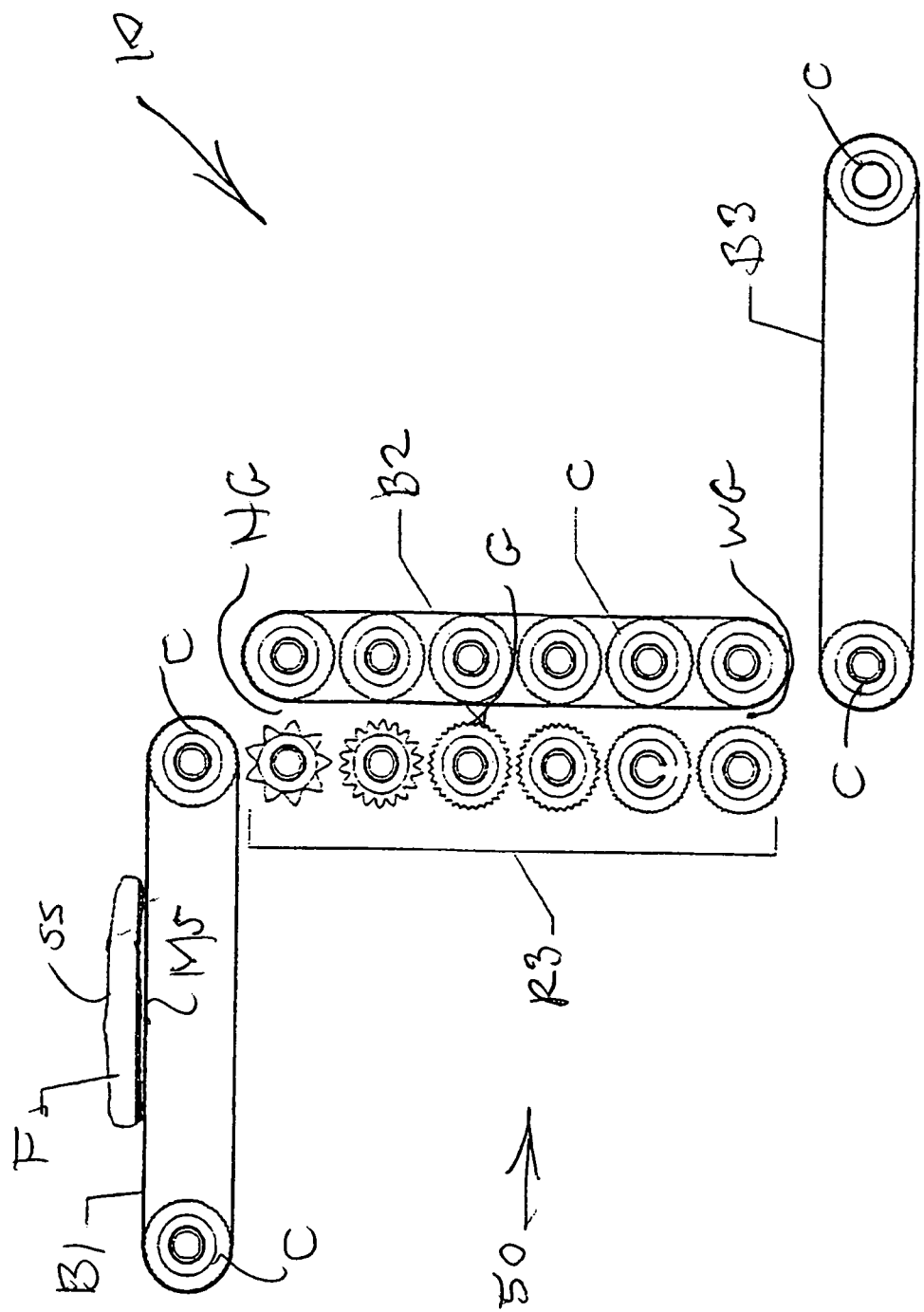
FIG. 7 is a view as in FIG. 5, except that the roller set includes six existing flattening rollers and six cylinder compressing conveyor belts.
Figure 8:
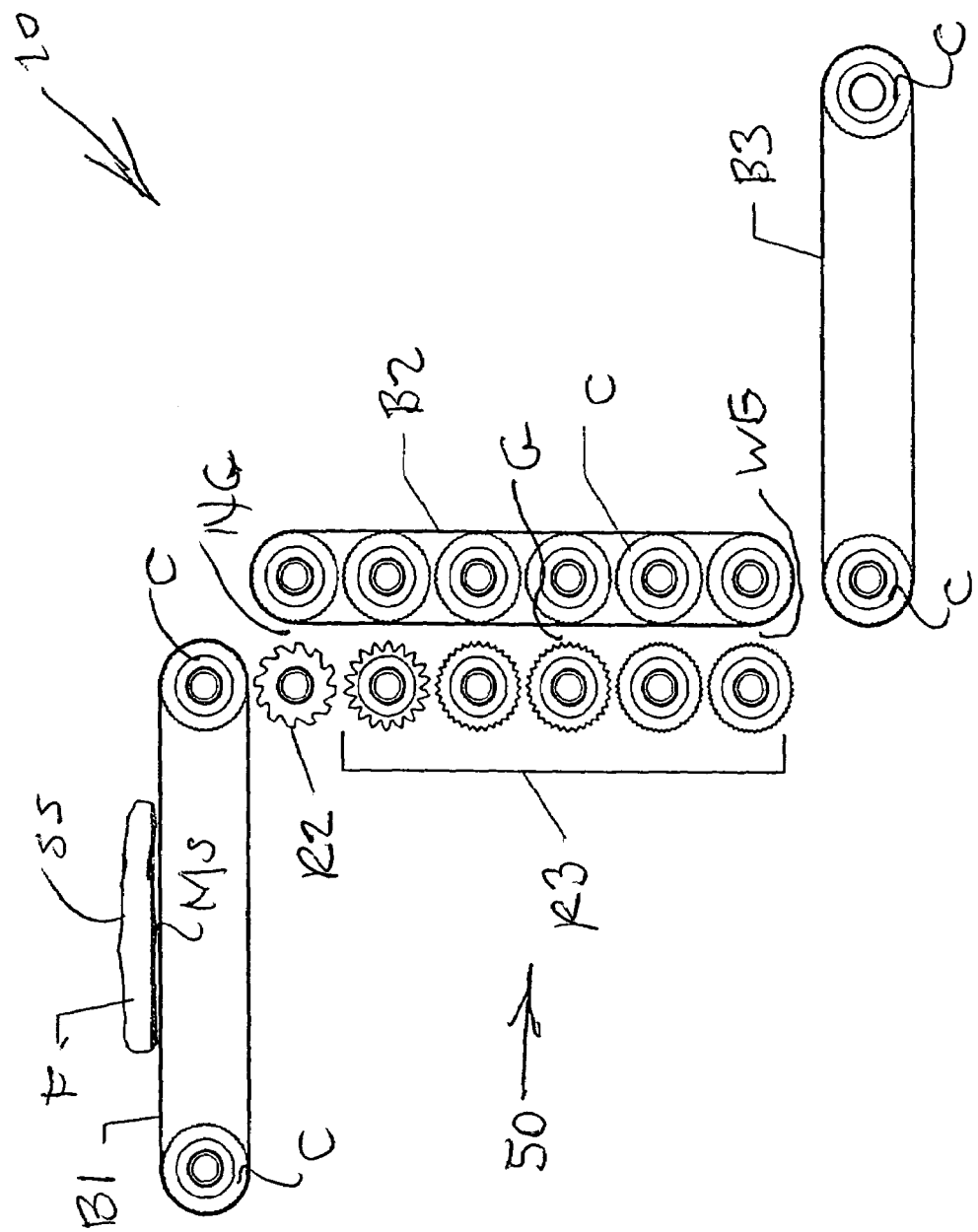
FIG. 8 is a view as in FIG. 1, except that the roller set includes one existing tenderizing roller, one existing scraper roller, four (existing flattening rollers and six cylinder compressing conveyor belts.

The compressing conveyor belt B2 may be on the bottom and the roller set S may be on the top, but is not limited to being on the top, with the top set having a first scraper roller R1, four tenderizing rollers R2, a second scraper roller R1, three flattening rollers R3, an existing strip cutter clearance roller R4, an existing strip cutter blade roller R5, and an existing strip cutter clearance roller R4 with the bottom compressing belt B2 having ten cylinders C followed by one strip cutter mate roller R6 and one flattening roller R3. See FIGS. 2 and 2a. The portion of the roller set S opposing the compressing conveyor belt B2 may include six flattening rollers R3, a strip cutter clearance roller R4, a strip cutter blade roller R5, a strip cutter clearance roller R4 and a dice cutter assembly DCA. With the bottom compressing conveyor belt B2 having seven cylinders C followed by one strip cutter mate roller R6, one flattening roller R3 and a dice cutter assembly DCA. See FIGS. 3 and 3a. The roller set S may include nine flattening rollers R3, one strip cutter clearance roller R4, one strip cutter blade roller R5, followed by one strip cutter clearance roller R4, with the bottom compressing conveyor belt B2 having ten cylinders C followed by a strip cutter mate roller R6 and a flattening roller R3. See FIGS. 4 and 4a. The bottom roller set S may include a different number of flattening rollers R3, such as twelve with the top compressing conveyor belt B2 having twelve cylinders C as shown in FIGS. 5 and 5a.

One version for smaller machines 10 includes a vertically oriented roller set and conveyor belt combination 50 having the wider gap end WG at the combination 50 upper end and the narrower gap end NG at the combination 50 lower end and having a single horizontal infeed conveyor belt B1 at the combination 50 upper end and positioned to drop food F into the wider gap end WG, and a single horizontal outfeed conveyor belt B3 positioned below the narrow gap end NG to receive and carry away food items F dropped from the roller set and conveyor belt combination 50. Various existing rollers R may be included in the roller set S as illustrated, including but not limited to tenderizing rollers R2 and a scraper roller R1, flattening rollers R3, a strip cutter clearance roller R4, a strip cutter blade roller R5 and a strip cutter mate roller R6. See three exemplary variations shown FIGS. 6-8.

Although a key inventive feature of the present apparatus 10 is providing a roller set S and an opposing conveyor belt B, a series of opposing conveyor belts B may be additionally provided before or after the roller set and conveyor belt combinations 50.

Second Preferred Embodiment

A second embodiment of the apparatus 100 includes a series of compressing conveyor belt pairs 60. See FIGS. 9-15. Once again, the pairs of opposing compressing conveyor belts B2 converge toward each other to define a gap G tapering from a wider gap end WG to a narrower gap end NG for progressively flattening food items F fed into the gap G at the wider gap end WG. To prevent the food item F from slipping backwards during flattening, the outer surfaces OS of the conveyor belt pair 60 has a coarse textures. It is preferred that a series two or more opposing compressing conveyor belt pairs 60 be provided which are aligned to pass food items F from the first compressing conveyor belt pair 60a into a second compressing conveyor belt pair 60b and optionally into a third compressing conveyor belt pair 60c. The coarseness of the belt outer surfaces OS of the second compressing conveyor belt pair 60b is less than that of the first compressing conveyor belt pair 60a, and the coarseness of the belt outer surfaces OS of the third compressing conveyor belt pair 60c is less than that of the second compressing conveyor belt pair 60b. The number of belt pairs 60 included would depended upon the muscle content of the food item F and the desired texture. And as in the first embodiment, the compressing conveyor belts B2 ride on belt cylinders C which are closely spaced.

One version of the second embodiment of apparatus 10 includes a single infeed conveyor belt B1, six opposing two cylinder compressing conveyor belt pairs 60 followed by an outfeed conveyor belt pair 70. See FIGS. 9 and 9a. Another version has four opposing three-cylinder C compressing conveyor belt pairs 60 as shown in FIGS. 10 and 10a. FIGS. 11 and 11a illustrate three opposing four-cylinder C compressing conveyor belt pairs 60. FIGS. 12 and 12a illustrate two opposing six cylinder C compressing conveyor belt pairs 60. FIGS. 13 and 13a illustrate the compressing conveyor belt 60 with the top compressing conveyor B2 containing nine cylinders C and combined with a strip cutter clearance roller R4 and a strip cutter blade roller R5 and a strip cutter clearance roller R4 with the bottom compressing conveyor belt B2 having ten cylinders C followed by one strip cutter mate roller R6 and one flattening roller R3. FIGS. 14 and 14a illustrate one compressing conveyor belt pair 60, with each compressing conveyor belt B2, top and bottom, containing twelve cylinders C. FIGS. 15 and 15a illustrate the compressing conveyor belt pair 60 with the top compressing conveyor belt B2 having six cylinders followed by one strip cutter clearance roller R4, one strip cutter roller R5, one strip cutter clearance roller R4 and one dice cutter assembly DCA, with the bottom compressing conveyor belt B2 having seven cylinders C followed by one strip cutter mate roller R6, one flattening roller R3 and one dice cutter assembly DCA.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An apparatus for tenderizing, progressively flattening and smoothing food items, comprising:
    a roller set of substantially parallel rollers arrayed laterally for contacting, mechanically advancing and tenderizing a first side of a food item;
    and a conveyor belt opposing and spaced apart from said roller set for contacting and advancing a food item second side, said roller set and said conveyor belt converging toward each other to define a gap between said roller set and said conveyor belt tapering from a wider gap end to a narrower gap end for progressively flattening food items fed into the wider gap end;
    said roller set and said conveyor belt defining a roller set and conveyor belt combination.

2. The apparatus of claim 1, wherein said conveyor belt rides on a plurality of belt cylinders passing through said conveyor belt, and at least one said belt cylinder and at least one said roller being independently driven by a gear train drivably connected to drive means.

3. The apparatus of claim 2, wherein said belt cylinders and said rollers are formed of one of: stainless steel, aluminum and plastic.

4. The apparatus of claim 2, wherein said belt cylinders have knurled grooves for enhanced conveyor belt traction.

5. The apparatus of claim 1, wherein said conveyor belt has a conveyor belt outward surface which is one of smooth and textured.

6. The apparatus of claim 1, wherein said rollers are configured to define at least one of a scraper roller and a tenderizing roller.

7. The apparatus of claim 1, additionally comprising at least one strip cutter.

8. The apparatus of claim 1, additionally comprising at least one dice cutter.

9. The apparatus of claim 1, comprising a plurality of said conveyor belts comprising an infeed conveyor belt for drawing food items into the wider gap end, an outfeed conveyor belt for delivering food items out of the narrower gap end, and a finisher conveyor belt for pressing the final texture onto a food item surface.

10. The apparatus of claim 1, comprising a series of at least first, second and third conveyor belts in which said first conveyor belt has outer surface grooves which are more coarse those of said second conveyor belt, which in turn are more coarse than those of said third conveyor belt.

11. The apparatus of claim 1, comprising a series of opposing compressing conveyor belt sets adjacent one of the wider gap end and the narrower gap end of said roller set and conveyor belt combination.

12. An apparatus for tenderizing, progressively flattening and smoothing food items, comprising:
a roller set of substantially parallel rollers arrayed laterally for contacting, mechanically advancing and tenderizing a first side of a food item;
and a conveyor belt opposing and spaced apart from said roller set for contacting and advancing a food item second side, said roller set and said conveyor belt converging toward each other to define a gap between said roller set and said conveyor belt tapering from a wider gap end to a narrower gap end for progressively flattening food items fed into the wider gap end;
said roller set and said conveyor belt defining a roller set and conveyor belt combination;
wherein said roller set and conveyor belt combination is vertically oriented such that the wider gap end is at the combination upper end and the narrower gap end is at the combination lower end, additionally comprising:
a substantially horizontally oriented infeed conveyor belt positioned to drop food items into the wider gap end;
and a substantially horizontal outfeed conveyor belt positioned below the narrow gap end to receive and carry away food items dropped from said roller set and conveyor belt combination.

13. An apparatus for tenderizing, progressively flattening and smoothing food items, comprising:
a series of first and second compressing conveyor belt pairs, each said conveyor belt pair comprising two opposing compressing conveyor belts with belt outer surfaces converging toward each other to define a gap tapering from a wider gap end to a narrower gap end for progressively flattening food items fed into the wider gap end, said second compressing conveyor belt pair having a narrower gap than that of said first compressing conveyor belt pair, said compressing conveyor belt pairs being aligned to pass food items from said first compressing conveyor belt pair into said second compressing conveyor belt pair.

14. The apparatus of claim 13, wherein each said compressing conveyor belt rides on a plurality of closely spaced belt cylinders passing through said conveyor belt, and at least one said belt cylinder being independently driven by a gear train drivably connected to drive means.

15. The apparatus of claim 13, wherein at least one said conveyor belt in at least one said conveyor belt pair is textured.

16. The apparatus of claim 15, wherein at least one said conveyor belt in each of said conveyor belt pairs is textured, and the texture of the belt outer surfaces of said second compressing conveyor belt pair is less coarse than that of said first compressing conveyor belt pair.

17. The apparatus of claim 16, wherein at least one said conveyor belt in at least one said conveyor belt pair has is textured.

18. An apparatus for tenderizing, progressively flattening and smoothing food items, comprising:
a roller set of substantially parallel rollers arrayed laterally for contacting, mechanically advancing and tenderizing a first side of a food item;
and a conveyor belt for contacting and advancing a food item second side, opposing and spaced apart from and substantially parallel to said roller set to define an substantially uniform gap between said roller set and said conveyor belt, for deep roller penetration when the food item initially enters the gap;
said roller set and said conveyor belt defining a roller set and conveyor belt combination.

19. An apparatus for tenderizing, progressively flattening and smoothing food items, comprising:
a roller set of substantially parallel rollers arrayed laterally for contacting, mechanically advancing and tenderizing a first side of a food item;
and a conveyor belt opposing and spaced apart from said roller set for contacting and advancing a food item second side, said roller set and said conveyor belt converging away from each other to define a gap between said roller set and said conveyor belt expanding from a narrower gap end to a wider gap end for deep roller penetration of the food item to leave a coarse texture on the food item;
said roller set and said conveyor belt defining a roller set and conveyor belt combination.

* * * * *